US009805275B2

(12) United States Patent
Okuda

(10) Patent No.: US 9,805,275 B2
(45) Date of Patent: Oct. 31, 2017

(54) DRIFT-ASSESSMENT DEVICE

(75) Inventor: Yuji Okuda, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 122 days.

(21) Appl. No.: 14/391,018

(22) PCT Filed: Apr. 25, 2012

(86) PCT No.: PCT/JP2012/061114

§ 371 (c)(1), (2), (4) Date: Oct. 7, 2014

(87) PCT Pub. No.: WO2013/161024

PCT Pub. Date: Oct. 31, 2013

(65) Prior Publication Data

US 2015/0117714 A1 Apr. 30, 2015

(51) Int. Cl.

| | |
|---|---|
| ***G06K 9/00*** | (2006.01) |
| ***G08B 21/06*** | (2006.01) |
| ***G08G 1/16*** | (2006.01) |
| ***B60W 30/12*** | (2006.01) |

(52) U.S. Cl.

CPC ......... *G06K 9/00798* (2013.01); *B60W 30/12* (2013.01); *G08B 21/06* (2013.01); *G08G 1/167* (2013.01); *B60W 2420/42* (2013.01); *B60W 2520/10* (2013.01); *B60W 2520/20* (2013.01); *B60W 2540/18* (2013.01)

(58) Field of Classification Search

CPC ............... G06K 9/00798; G08G 1/167; G08G 1/096725; B62D 15/025; B62D 15/029; B62D 6/00; B60W 30/12; B60W 2420/42; B60W 10/20; B60R 1/00; B60R 11/04; B60R 2300/302; G08B 21/06; B60T 2201/08; B60T 8/17557

See application file for complete search history.

(56) References Cited

U.S. PATENT DOCUMENTS 7,634,346 B2 * 12/2009 Abe .................. B60K 31/0066 701/70
8,885,888 B2 * 11/2014 Higuchi .................. G08G 1/16 382/100
2011/0205042 A1 * 8/2011 Takemura ............. G08G 1/166 340/435

FOREIGN PATENT DOCUMENTS

JP 2007-265101 A 10/2007

* cited by examiner

*Primary Examiner* — Andrew Moyer
*Assistant Examiner* — Dennis Rosario
(74) *Attorney, Agent, or Firm* — Sughrue Mion, PLLC

(57) ABSTRACT

A drift-assessment device includes a turn information detection unit that detects turn information of a vehicle, an image recognition and detection unit that detects position information of the vehicle relative to a lane, a vehicle speed detection unit that detects a vehicle speed, a selection unit that selects the image recognition and detection unit when the vehicle speed is equal to or greater than a predetermined vehicle speed and selects the turn information detection unit when the vehicle speed is less than the predetermined vehicle speed, and a drift-assessment unit that determines the drift of the vehicle based on the position information of the vehicle relative to the lane when the selection unit selects the image recognition and detection unit and determines the drift of the vehicle based on the turn information of the vehicle when the selection unit selects the turn information detection unit.

3 Claims, 4 Drawing Sheets

(a)

(b)

DRIFT-ASSESSMENT DEVICE

CROSS REFERENCE TO RELATED APPLICATIONS

This application is a National Stage of International Application No. PCT/JP2012/061114 filed Apr. 25, 2012, the contents of which are incorporated herein by reference in their entirety.

TECHNICAL FIELD

The present invention relates to a drift-assessment device including a turn information detection unit that detects turn information of a vehicle and an image recognition and detection unit that detects information about a position of the vehicle relative to a lane by an image recognition of a captured image including a road on which the vehicle is traveling.

BACKGROUND ART

A system has been developed which determines the consciousness-degraded state of the driver of the vehicle due to, for example, fatigue, drowsiness, and inattentive driving and outputs a warning to the driver. As a method for determining the consciousness-degraded state, for example, there is a method which determines the drift of the vehicle in the lane as a unique steering pattern which appears in the consciousness-degraded state. Patent Literature 1 discloses a device which includes image recognition and detection means for recognizing a lane on the basis of the image of the front side of the vehicle which is captured by an in-vehicle camera and detecting the position of the vehicle relative to the lane and steering angle detection means for detecting the steering angle of a steering wheel and determines drift using a combination of the two detection means.

CITATION LIST

Patent Literature

[Patent Literature 1] Japanese Unexamined Patent Application Publication No. 2007-265101

SUMMARY OF INVENTION

Technical Problem

In general, roads which are designed for high-speed travel, such as an expressway and a bypass, have lanes and the image recognition and detection means can recognize the lanes. However, a steering angle for turning the vehicle is reduced as the speed increases and drift occurs at a small steering angle. In this case, it is difficult to accurately determine drift using the steering angle detected by the steering angle detection means. In contrast, in many cases, the lane is intermittently provided or no lane is provided on roads which are designed for low-speed travel, such as roads in residential streets. In this case, it is often impossible to recognize the lane using the image recognition and detection means. However, the steering angle for turning the vehicle increases as the speed decreases and drift occurs at a large steering angle. Therefore, it is possible to determine drift with high accuracy, using the steering angle detected by the steering angle detection means.

Therefore, as in the above-mentioned structure, when two detection means are used, drift is likely to be determined on the basis of information with low reliability, depending on a vehicle speed range, and this structure needs to be improved in order to determine drift with high accuracy. In addition, since the two detection means are constantly operated, energy efficiency is reduced.

An object of the invention is to provide a drift-assessment device that includes two detection means for determining drift and can determine the drift with high energy efficiency and high accuracy.

Solution to Problem

According to an aspect of the invention, a drift-assessment device includes a turn information detection unit that detects turn information of a vehicle, an image recognition and detection unit that recognizes a captured image including a road on which the vehicle is traveling and detects information about a position of the vehicle relative to a lane, a vehicle speed detection unit that detects a speed of the vehicle, a selection unit that selects the image recognition and detection unit when the speed of the vehicle detected by the vehicle speed detection unit is equal to or greater than a predetermined vehicle speed and selects the turn information detection unit when the speed of the vehicle detected by the vehicle speed detection unit is less than the predetermined vehicle speed, and a drift-assessment unit that determines the drift of the vehicle on the basis of the information about the position of the vehicle relative to the lane when the selection unit selects the image recognition and detection unit and determines the drift of the vehicle on the basis of the turn information of the vehicle when the selection unit selects the turn information detection unit.

The drift-assessment device includes two detection means, that is, the turn information detection unit and the image recognition and detection unit, and determines the drift of the vehicle using one of the two detection means. The turn information detection unit is means for detecting the turn information (for example, a steering angle, a steering angle speed, and a yaw rate) of the vehicle. The steering angle for turning the vehicle is reduced as the speed increases. Therefore, it is difficult to accurately determine the drift using the turn information detected by the turn information detection unit. In contrast, the steering angle for turning the vehicle increases as the speed decreases. Therefore, it is possible to determine the drift using the turn information detected by the turn information detection unit. The image recognition and detection unit is means for recognizing the traveling lane by recognizing the captured image including the road on which the vehicle is traveling and detecting information (for example, the amount of offset from the center of the lane (lateral position)) about the position of the vehicle relative to the lane. In general, roads designed for relatively high-speed travel, such as an expressway, a bypass, and freeway, have the lanes. In an environment with lanes, it is possible to recognize the lane using the image recognition and detection unit and to obtain the information about the position of the vehicle relative to the lane. In contrast, in many cases, the line is intermittently provided or no lane is provided on roads which are designed for low-speed travel, such as roads in residential streets, due to intersections, two-way roads, and narrow roads. As such, in an environment without the lane, it is difficult for the image recognition and detection unit to recognize the lane (in some cases, any lanes cannot be recognized). Therefore, it is impossible to obtain the information about the position of the vehicle relative to the lane.

In the drift-assessment device, the vehicle speed detection unit detects the speed of the vehicle and the selection unit selects the image recognition and detection unit as detection means for determining drift when the speed of the vehicle is equal to or greater than the predetermined vehicle speed and selects the turn information detection unit when the speed of the vehicle is less than the predetermined vehicle speed. The predetermined vehicle speed is at the boundary between a vehicle speed range (high-speed side) in which the image recognition and detection unit can be used to obtain information with higher reliability for determining drift than the turn information detection unit and a vehicle speed range (low-speed side) in which the turn information detection unit can be used to obtain information with higher reliability for determining drift than the image recognition and detection unit. In the drift-assessment device, the drift-assessment unit determines the drift of the vehicle on the basis of the information about the position of the vehicle relative to the lane when the image recognition and detection unit is selected and determines the drift of the vehicle on the basis of the turn information of the vehicle when the turn information detection unit is selected. As such, the drift-assessment device uses only the detection means which is effective (has high reliability) to determine drift, depending on the speed of the vehicle. Therefore, energy efficiency is improved and it is possible to determine drift in the entire vehicle speed range with high accuracy. When the detection means which is not used to determine drift is stopped, the highest energy efficiency is obtained. Even though the detection means is not stopped, only the information of one detection means is used to perform the drift-assessment processing (that is, the information of both of the two detection means is not used for the drift-assessment process). Therefore, a processing load is reduced and energy efficiency is improved.

The drift-assessment device according to the above-mentioned aspect of the invention may further include a learning unit that determines the predetermined vehicle speed on the basis of the speed of the vehicle detected by the vehicle speed detection unit when an image recognition state is changed between a state in which the image recognition and detection unit can recognize the lane and a state in which the image recognition and detection unit cannot recognize the lane. As such, in the drift-assessment device, the predetermined vehicle speed is learned on the basis of the speed of the vehicle when the image recognition state is changed between the state in which the image recognition and detection unit can recognize the lane and the state in which the image recognition and detection unit cannot recognize the lane. Therefore, it is possible to determine drift in a vehicle speed range in which the image recognition and detection unit is likely to actually recognize the lane, using the image recognition and detection unit.

Advantageous Effects of Invention

According to the invention, only the detection means which is effective to determine drift is used, depending on the speed of the vehicle. Therefore, energy efficiency is improved and it is possible to determine drift in the entire vehicle speed range with high accuracy.

BRIEF DESCRIPTION OF DRAWINGS

FIG. 4(*a*) is a flowchart illustrating a current vehicle speed storage process and FIG. 4(*b*) is a flowchart illustrating a process for calculating the vehicle speed range switching threshold value.

DESCRIPTION OF EMBODIMENTS

Figure 1:
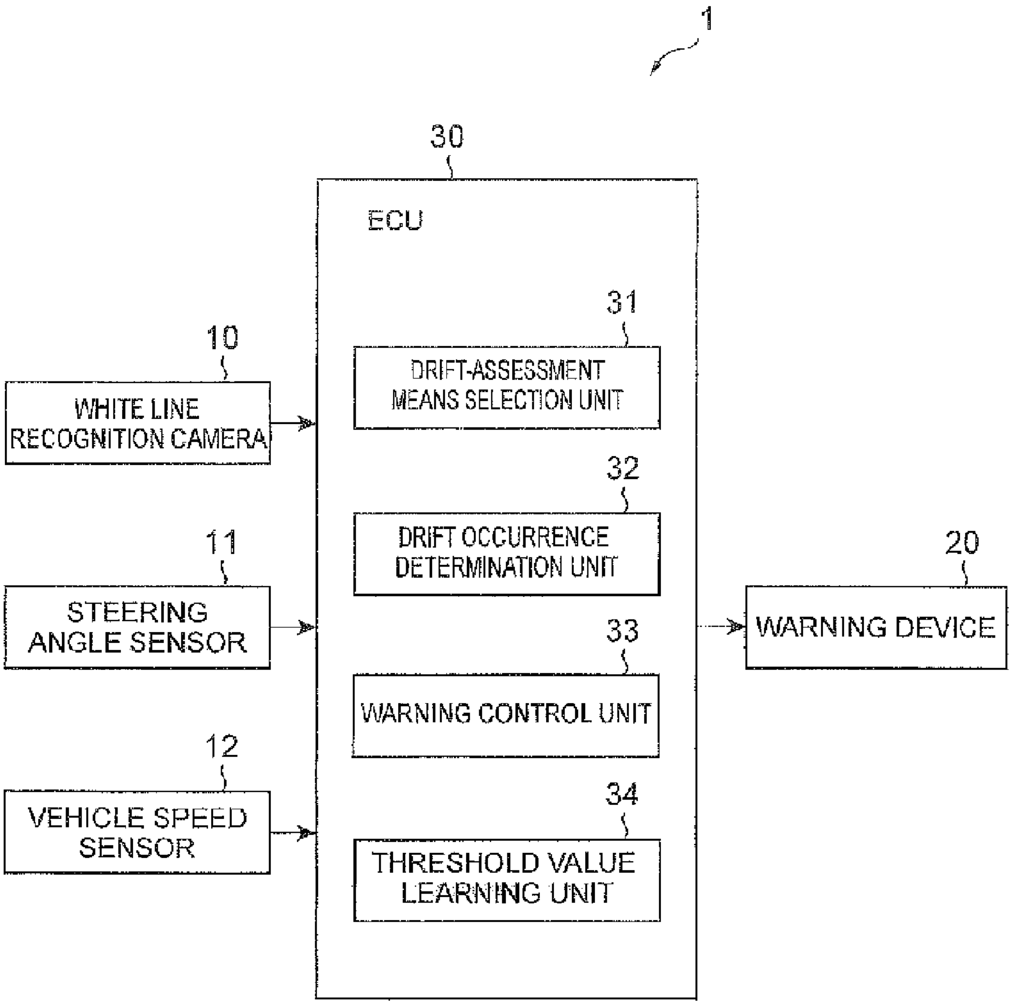
FIG. 1 is a diagram illustrating the structure of a consciousness degradation determination system according to an embodiment.

Hereinafter, an embodiment of a drift-assessment device according to the invention will be described with reference to the drawings. In the drawings, the same or equivalent components are denoted by the same reference numerals and the description thereof will not be repeated.

In this embodiment, the invention is applied to a consciousness degradation determination system that determines whether a driver is in a consciousness-degraded state and issues a warning when the driver is in the consciousness-degraded state. The consciousness degradation determination system according to this embodiment includes two detection means, that is, a white line recognition camera and a steering angle sensor, determines whether drift (wandering) occurs using any one of the detection means, and determines that the driver is in the consciousness-degraded state when drift occurs.

The consciousness degradation determination system according to this embodiment may operate, for example, when an ACC power supply is turned on or when an engine starts, or predetermined operation conditions or cancellation conditions may be set. As the operation conditions, for example, when the speed of the vehicle is equal to or greater than a predetermined value, the system operates. As the cancel conditions, for example, when a left or right indicator switch is turned on, the system may be temporarily stopped so as not to operate while the driver is changing the lane, or the system may be temporarily stopped by operations of the driver other than the operation of the indicator.

Next, a consciousness degradation determination system 1 according to this embodiment will be described with reference to FIG. 1. FIG. 1 is a diagram illustrating the structure of the consciousness degradation determination system.

In order to determine drift in the entire vehicle speed range with high energy efficiency and high accuracy, the consciousness degradation determination system 1 determines drift on the basis of the amount of offset from the center of the lane (information about the position of the vehicle relative to the lane) in a high speed range, using only the white line recognition camera, and determines drift on the basis of the steering angle (turn information) in the low speed range, using only the steering angle sensor. In addition, in order to set a vehicle speed range in which the white line can be actually recognized by the white line recognition camera, the consciousness degradation determination system 1 learns a vehicle speed range switching vehicle speed using the speed of the vehicle when the white line recognition camera is changed from a white line non-recognition state to a white line recognition state.

When the consciousness of the driver is degraded due to, for example, fatigue, drowsiness, or inattentive driving, the lateral position of the vehicle greatly deviates from the center of the lane and then the driver performs correction steering in order to return to the center of the lane. When the correction steering is repeated, the vehicle is likely to drift. It is possible to determine the consciousness-degraded state of the driver by detecting a change pattern of the amount of offset or a change pattern of the steering angle which indicates the drift of the vehicle corresponding to the steering operation of the driver. When the driver is in the consciousness-degraded state, the vehicle approaches the left or right white line and then the driver performs correction steering in the opposite direction. The correction steering is periodically repeated. Therefore, in the change pattern of the amount of offset indicating the drift of the vehicle, for example, the amount of offset is repeatedly changed as follows: the amount of offset (the lateral position of the vehicle) on one of the left and right sides of the lane gradually increases; the amount of offset on the one side is at a peak when correction steering to the other side starts; the amount of offset on the one side is gradually reduced to 0 after the correction steering starts; the amount of offset on the other side gradually increases; the amount of offset on the other side is at a peak when correction steering to the one side starts; the amount of offset on the other side is gradually reduced to 0 after the correction steering starts; and the amount of offset on the one side gradually increases. In the change pattern of the steering angle indicating the drift of the vehicle, for example, the steering angle is repeatedly changed as follows: a predetermined steering angle (peak) is maintained in one turn direction of the steering wheel; the steering angle in the one turn direction is rapidly reduced to 0 after correction steering to the other turn direction starts; the steering angle in the other turn direction rapidly increases; a predetermined steering angle (peak) in the other turn direction is maintained; the steering angle in the other turn direction is rapidly reduced to 0 after correction steering to the one turn direction starts; and the steering angle in the one turn direction rapidly increases.

The consciousness degradation determination system 1 includes a white line recognition camera 10, a steering angle sensor 11, a vehicle speed sensor 12, a warning device 20, and an electronic control unit [ECU] 30 (a drift-assessment means selection unit 31, a drift occurrence determination unit 32, a warning control unit 33, and a threshold value learning unit 34). In this embodiment, the white line recognition camera 10 corresponds to an image recognition and detection unit in the claims, the steering angle sensor 11 corresponds to a turn information detection unit in the claims, the vehicle speed sensor 12 corresponds to a vehicle speed detection unit in the claims, the drift-assessment means selection unit 31 corresponds to a selection unit in the claims, the drift occurrence determination unit 32 corresponds to a drift-assessment unit in the claims, and the threshold value learning unit 34 corresponds to a learning unit in the claims.

The white line recognition camera 10 is a camera sensor which recognizes a pair of left and right white lines forming a lane and includes a camera and a processing device. The camera is provided on the front side of the host vehicle and is attached such that the direction of the optical axis is aligned with the traveling direction of the host vehicle. The camera captures the image of a region including the road in front of the host vehicle at a predetermined time interval, acquires the captured image, and outputs image information to the processing device. The camera has a sufficiently wide imaging range to capture the left and right (a pair of) white lines forming a traveling lane in the left-right direction. The camera may be a color camera or a black-and-white camera.

The processing device recognizes a pair of left and right white lines forming the traveling lane of the host vehicle from the image whenever the image information is input from the camera. As the recognition method, for example, there is a method which performs edge processing since there is a large difference in brightness between a road surface and the white lines on the road surface. Then, for example, the processing device calculates, from the recognized pair of left and right white lines, the width of the lane, a line that passes through the center of the pair of left and right white lines, the radius or curvature of the curve of a center line of the lane or the white lines, the amount of offset (lateral position) of the host vehicle from the center of the lane, and the yaw angle (direction) of the host vehicle with respect to the center line of the lane. Then, the white line recognition camera 10 transmits the recognition result of the white lines (for example, the recognition of both the left and right white lines, the recognition of only the left white line, the recognition of only the right white line, and the non-recognition of both the left and right white lines) or various kinds of calculated information as a white line recognition signal to the ECU 30 at a predetermined time interval.

In general, roads designed for relatively high-speed travel, such as an expressway, a bypass, and freeway, have the left and right white lines forming the lane. In an environment with the white lines, the white line recognition camera 10 can recognize the white lines and obtain the amount of offset from the center of the lane. In this case, it is possible to determine drift using the white line recognition camera 10. However, in many cases, the white lines are intermittently provided or no white lines are provided on roads which are designed for low-speed travel, such as roads in residential streets, due to intersections, two-way roads, and narrow roads. As such, in an environment without white lines, it is difficult for the white line recognition camera 10 to recognize the white lines. Therefore, in some cases, it is impossible to recognize any white lines. In this case, it is impossible to determine drift using the white line recognition camera 10.

The steering angle sensor 11 is a sensor which detects the steering angle of the steering wheel input by the driver. The steering angle sensor 11 detects the steering angle at a predetermined time interval and outputs the detected steering angle as a steering angle signal to the ECU 30.

The steering angle for turning the vehicle is reduced as the speed increases and drift occurs at a small steering angle. In this case, it is difficult to accurately determine drift using the steering angle sensor 11. However, the steering angle for turning the vehicle increases as the speed decreases and drift occurs at a large steering angle. In this case, it is possible to determine drift using the steering angle sensor 11.

The vehicle speed sensor 12 is a sensor which detects the speed of the host vehicle. The vehicle speed sensor 12 detects the speed of the vehicle at a predetermined time interval and transmits the detected speed of the vehicle as a vehicle speed signal to the ECU 30.

The warning device 20 is a device which outputs a warning for calling the driver's attention to the consciousness-degraded state. As a method for issuing the warning, for example, the following methods are used: a warning sound is output from a speaker; a warning screen is displayed on a display of a navigation system; a warning lamp in a combination meter is turned on; a seat vibration generation device vibrates a seat; and a steering wheel vibration generation device vibrates the steering wheel. When receiving a warning output signal from the ECU 30, the warning device 20 outputs a warning in response to the warning output signal.

The ECU 30 is an electronic control unit including, for example, a central processing unit [CPU], a read only memory [ROM], and a random access memory [RAM] and controls the overall operation of the consciousness degradation determination system 1. The ECU 30 loads an application program stored in the ROM to the RAM and executes the application program using the CPU to form the drift-assessment means selection unit 31, the drift occurrence determination unit 32, the warning control unit 33, and the threshold value learning unit 34. The ECU 30 receives each signal from the white line recognition camera 10, the steering angle sensor 11, and the vehicle speed sensor 12 and the processing units 31, 32, 33, and 34 perform processing using the information of each signal. When it is determined that the driver is in the consciousness-degraded state (drift occurs), the ECU 30 transmits the warning output signal to the warning device 20.

The drift-assessment means selection unit 31 is a processing unit which selects detection means used to determine drift from the white line recognition camera 10 and the steering angle sensor 11. Specifically, the drift-assessment means selection unit 31 determines whether the speed of the vehicle acquired from the vehicle speed sensor 12 is equal to or greater than a vehicle speed range switching threshold value Th_S. The vehicle speed range switching threshold value Th_S is a vehicle speed threshold value indicating the boundary between a vehicle speed range (high-speed side) in which the white line recognition camera 10 is used to obtain high-reliability information for determining drift and a vehicle speed range (low-speed side) in which the steering angle sensor 11 is used to obtain high-reliability information for determining drift. The initial value of Th_S is set in advance, considering the speed limit of the road with the white lines. When a threshold value learning unit 34, which will be described below, performs learning, a learning value is set to Th_S. The drift-assessment means selection unit 31 selects the white line recognition camera 10 as the detection means used to determine drift when the speed of the vehicle is equal to or greater than the vehicle speed range switching threshold value Th_S and selects the steering angle sensor 11 as the detection means used to determine drift when the speed of the vehicle is less than the vehicle speed range switching threshold value Th_S.

The drift occurrence determination unit 32 is a processing unit which determines whether drift occurs using the detection means selected by the drift-assessment means selection unit 31. The drift occurrence determination unit 32 determines that the driver is in the consciousness-degraded state when drift occurs. Specifically, when the drift-assessment means selection unit 31 selects the white line recognition camera 10, the drift occurrence determination unit 32 determines whether drift occurs from a waveform indicating a change in the amount of offset, using time-series data for the amount of offset which is acquired from the white line recognition camera 10 at a predetermined time interval. The method according to the related art is used as a method for determining whether drift occurs on the basis of the amount of offset. For example, the method determines a first condition that a difference between the peak value of a left offset amount and the peak value of a right offset amount is equal to or greater than a peak value difference threshold value, a second condition that the cycle of the peak value is in a peak value cycle range, and a third condition that the number of times the peak value satisfying the first condition and the second condition successively appears is equal to or greater than a number-of-time threshold value. In the case of a waveform satisfying all of the first condition, the second condition, and the third condition, it is determined that drift occurs. When the drift-assessment means selection unit 31 selects the steering angle sensor 11, the drift occurrence determination unit 32 determines whether drift occurs from a waveform indicating a change in the steering angle, using time-series data for the steering angle which is acquired from the steering angle sensor 11 at a predetermined time interval. The method according to the related art is used as a method for determining whether drift occurs on the basis of the steering angle. For example, similarly to the amount of offset, the method determines a first condition, a second condition, and a third condition using the peak value of the steering angle in the left turn direction and the peak value of the steering angle in the right turn direction. In the case of a waveform satisfying all of the first condition, the second condition, and the third condition, it is determined that drift occurs.

When it is determined that drift occurs, the drift occurrence determination unit 32 determines that the driver is in the consciousness-degraded state and turns on a consciousness degradation flag. The consciousness degradation flag is an ON/OFF flag, is turned on when the driver is in the consciousness-degraded state, and is turned off when the driver is in a normal state.

The warning control unit 33 is a processing unit for outputting a warning when the drift occurrence determination unit 32 determines that the driver is in the consciousness-degraded state. Specifically, when the drift occurrence determination unit 32 determines that the driver is in the consciousness-degraded state (the consciousness degradation flag is turned on), the warning control unit 33 transmits a warning output signal for outputting a warning to the warning device 20.

The threshold value learning unit 34 is a processing unit which learns the vehicle speed range switching threshold value Th_S used by the drift-assessment means selection unit 31 on the basis of the recognition result of the white line recognition camera 10. Specifically, the threshold value learning unit 34 determines whether a white line recognition state is changed from a state in which the white line is not recognized to a state in which the white line can be recognized (both the left and right white lines can be recognized) on the basis of the recognition result which is acquired from the white line recognition camera 10 at a predetermined time interval. Whenever determining that the state is changed, the threshold value learning unit 34 stores the speed of the vehicle detected by the vehicle speed sensor 12 and increases the value of a vehicle speed storage counter. When the value of the vehicle speed storage counter is greater than a threshold value Th_C, the threshold value learning unit 34 calculates the average value of the stored speed of the vehicle and stores the average value in the vehicle speed range switching threshold value Th_S. The threshold value Th_C is the number of times data for the speed of the vehicle at which the white line recognition camera 10 is likely to actually recognize the white lines is sufficiently obtained and is appropriately set in advance.

When the vehicle speed storage counter is initialized and when the counter value are equal to or greater than the threshold value Th_C, the vehicle speed storage counter is reset to 0. Therefore, when the counter value is less than the threshold value Th_C and the traveling of the vehicle ends, the value of the vehicle speed storage counter is held until the next traveling and the stored vehicle speed data is also held. In the learning process, the threshold value learning unit 34 may calculate the learning value when the value of the vehicle speed storage counter is equal to or greater than the threshold value Th_C one time, and end the learning process. Alternatively, the threshold value learning unit 34 may continuously perform the learning process even after the value of the vehicle speed storage counter is equal to or greater than the threshold value Th_C one time, perform the learning process again, further using the second or subsequent vehicle speed data, and update the learning value of the previous learning process.

Figure 2:
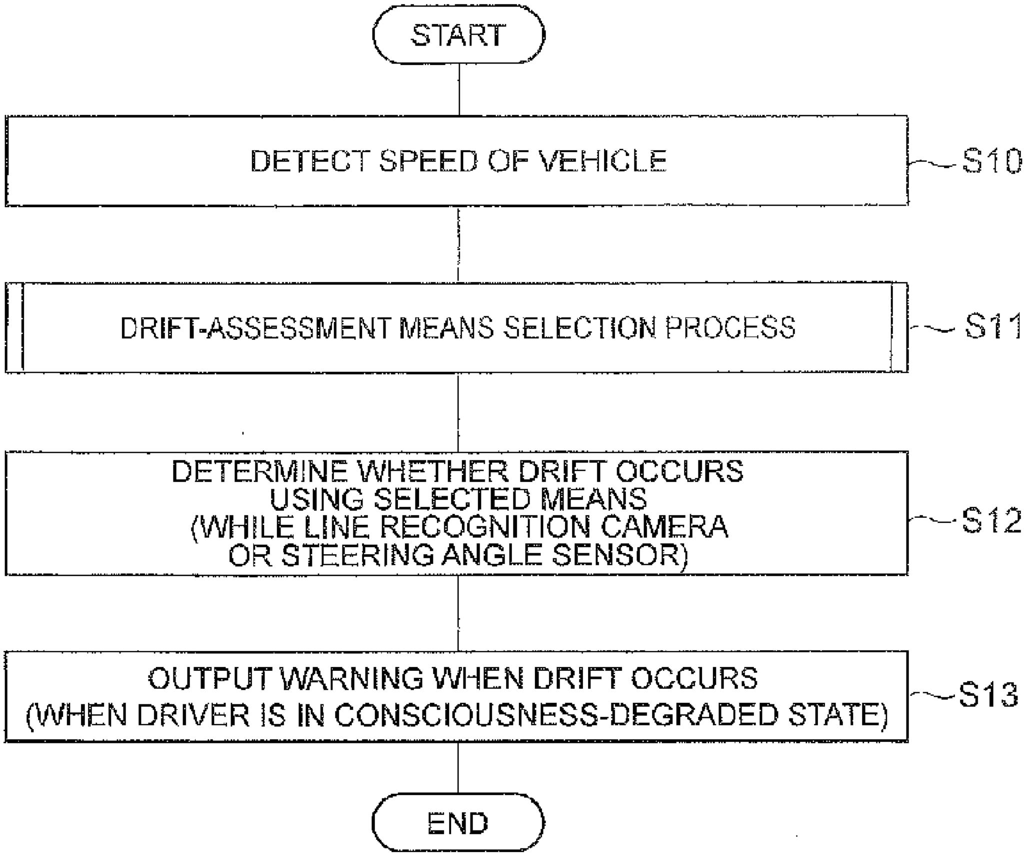
FIG. 2 is a flowchart illustrating the flow of a main operation of the consciousness degradation determination system according to this embodiment.
Figure 3:
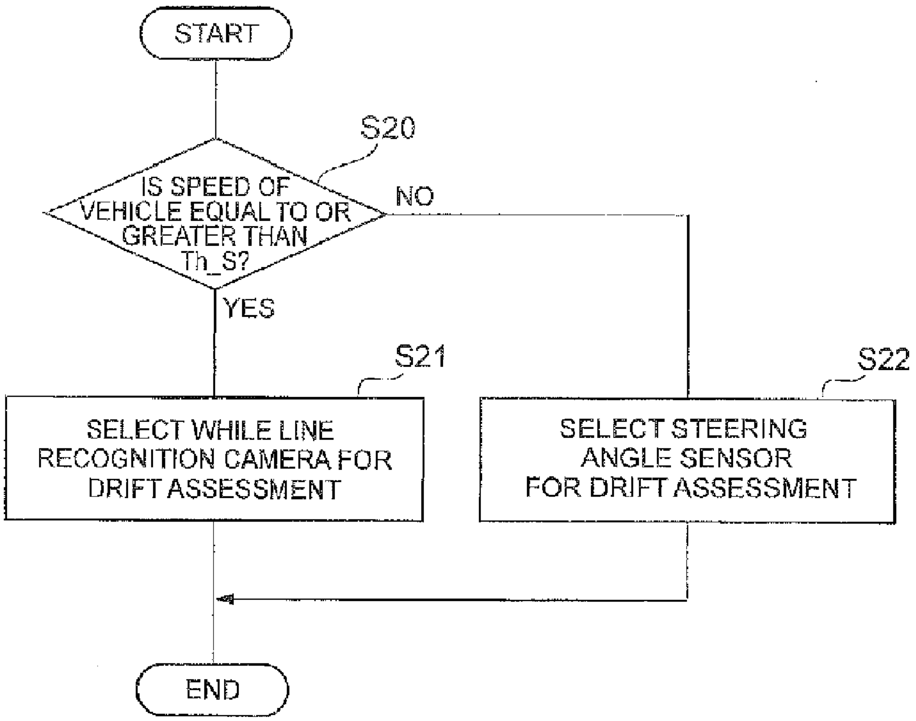
FIG. 3 is a flowchart illustrating the flow of a drift-assessment means selection process in the flowchart of FIG. 2 illustrating the main operation.
Figure 4:
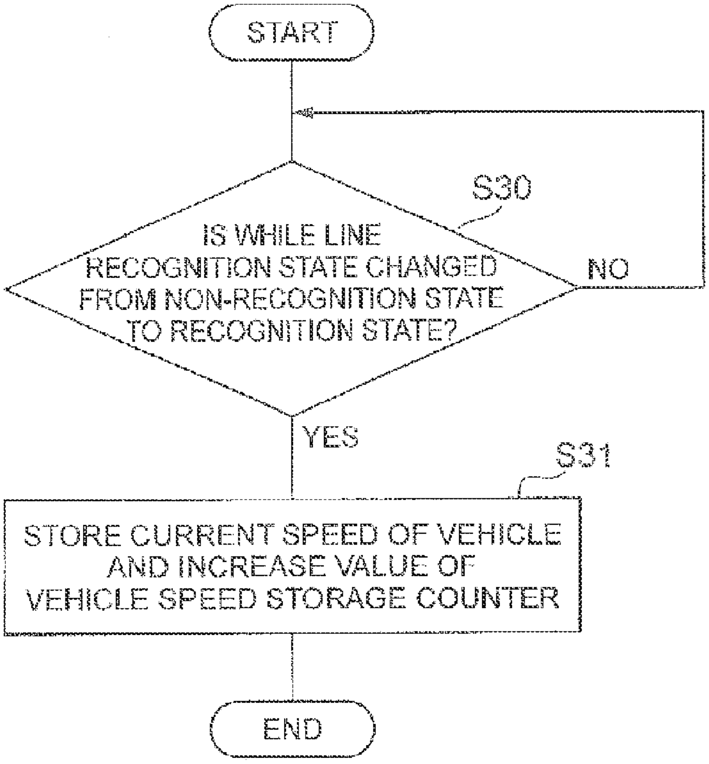
FIG. 4 is a flowchart illustrating the flow of a process for learning a vehicle speed range switching threshold in the consciousness degradation determination system according to this embodiment.
Figure 4:
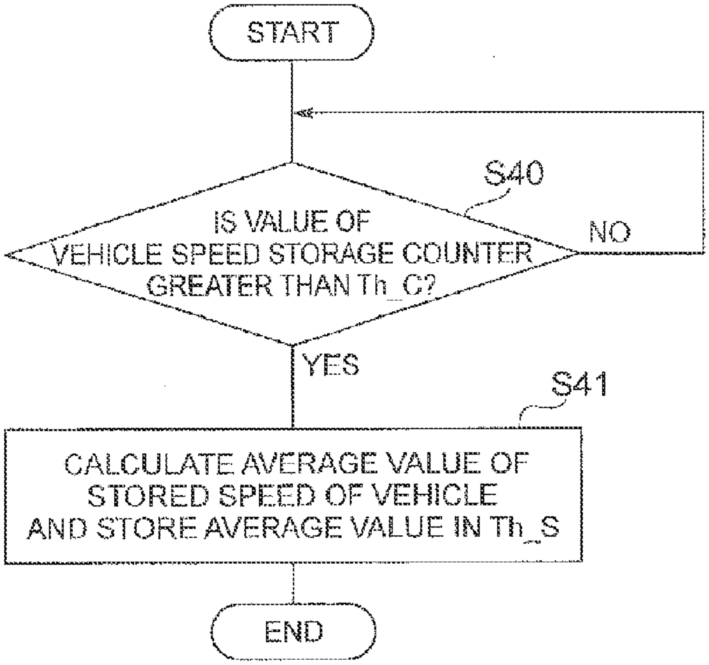

The operation of the consciousness degradation determination system 1 will be described with reference to FIG. 1. In particular, the overall operation will be described with reference to the flowchart shown in FIG. 2. A drift-assessment means selection process will be described with reference to the flowchart shown in FIG. 3. A process for learning the vehicle speed range switching threshold value will be described with reference to the flowchart shown in FIG. 4. FIG. 2 is a flowchart illustrating the flow of a main operation. FIG. 3 is a flowchart illustrating the flow of the drift-assessment means selection process in the flowchart illustrating the main operation. FIG. 4 is a flowchart illustrating the flow of the process for learning the vehicle speed range switching threshold value. FIG. 4(*a*) is a flowchart illustrating a current vehicle speed storage process and FIG. 4(*b*) is a flowchart illustrating a process for calculating the vehicle speed range switching threshold value. The consciousness degradation determination system 1 repeatedly performs the following operation at a predetermined time interval while operating.

The white line recognition camera 10 captures the image of a region including the road in front of the host vehicle. Then, the white line recognition camera 10 recognizes a pair of left and right white lines indicating the traveling lane of the host vehicle from the captured image and calculates, from the pair of left and right white lines, the width of the lane, a center line of the pair of left and right white lines, the radius and curvature of a curve, the amount of offset from the center of the lane, a yaw angle with respect to a center line of the lane, and so on. Then, the white line recognition camera 10 transmits the recognition result of the white lines and various kinds of calculated information as the white line recognition signal to the ECU 30. The ECU 30 receives the white line recognition signal and acquires the recognition result of the white lines and various kinds of information.

The steering angle sensor 11 detects the steering angle and transmits the detected steering angle as the steering angle signal to the ECU 30. The ECU 30 receives the steering angle signal and acquires the steering angle.

The vehicle speed sensor 12 detects the speed of the vehicle and transmits the detected speed of the vehicle as the vehicle speed signal to the ECU 30 (S10). The ECU 30 receives the vehicle speed signal and acquires the speed of the vehicle.

The ECU 30 performs the drift-assessment means selection process (S11). First, the ECU 30 determines whether the speed of the vehicle is equal to or greater than the vehicle speed range switching threshold value Th_S (S20). When determining that the speed of the vehicle is equal to or greater than Th_S in S20, the ECU 30 selects the white line recognition camera 10 for drift assessment (S21). At that time, when other systems do not use the steering angle sensor 11, the steering angle sensor 11 may be stopped. When determining that the speed of the vehicle is less than Th_S in S20, the ECU 30 selects the steering angle sensor 11 for drift assessment (S22). At that time, when other systems do not use the white line recognition camera 10, the white line recognition camera 10 may be stopped.

When selecting the white line recognition camera 10 in S21, the ECU 30 determines whether drift occurs on the basis of time-series data for the amount of offset obtained by the white line recognition camera 10 (S12). Alternatively, when selecting the steering angle sensor 11 in S22, the ECU 30 determines whether drift occurs on the basis of time-series data for the steering angle obtained by the steering angle sensor 11 (S12). When determining that drift occurs, the ECU 30 determines that the driver is in the consciousness-degraded state (turns on the consciousness degradation flag) and transmits the warning output signal to the warning device 20 (S13).

When receiving the warning output signal, the warning device 20 outputs a warning (S13). The driver can recognize the degradation of consciousness from the warning and makes an appropriate response, such as a rest, if necessary.

The ECU 30 determines whether the white line recognition state is changed from a white line non-recognition state to a white line recognition state on the basis of the recognition result of the white line recognition camera 10 (S30). When determining that the white line recognition state is not changed, the ECU 30 performs the determination again after a predetermined period of time. When determining that the white line recognition state is changed from the white line non-recognition state to the white line recognition state in S30, the ECU 30 stores the current speed of the vehicle detected by the vehicle speed sensor 12 and increases the value of the vehicle speed storage counter (S31).

The ECU 30 determines whether the value of the vehicle speed storage counter is greater than Th_C (S40). When determining that the counter value is equal to or less than Th_C, the ECU 30 performs the determination again after a predetermined period of time. When determining that the counter value is greater than Th_C in S40, the ECU 30 calculates the average value of the stored speed of the vehicle and stores the average value in the vehicle speed range switching threshold value Th_S (S41). When the learning value has already been stored in Th_S, the ECU 30 may update the learning value, considering the currently stored average value of the speed of the vehicle.

According to the consciousness degradation determination system 1, only the white line recognition camera 10 is used to determine drift in the high speed range and only the steering angle sensor 11 is used to determine drift in the low speed range. Therefore, energy efficiency is improved and it is possible to determine drift in the entire vehicle speed range with high accuracy. As a result, it is possible to determine the consciousness-degraded state of the driver with high accuracy. When the detection means which is not used to determine drift is stopped, the highest energy efficiency is obtained. Even though the detection means is not stopped, only the information of one detection means is used to perform the drift-assessment process. Therefore, a processing load is reduced and energy efficiency is improved.

According to the consciousness degradation determination system 1, when the white line recognition camera 10 is changed from the white line non-recognition state to the white line recognition state, the speed of the vehicle is stored and the vehicle speed range switching vehicle speed is learned on the basis of the stored vehicle speed data. Therefore, it is possible to determine drift using the white line recognition camera 10 in the vehicle speed range in which the white line recognition camera 10 is likely to actually recognize the white lines.

The embodiment of the invention has been described above. However, the invention is not limited to the above-described embodiment, but various modifications and changes of the invention can be made.

For example, this embodiment is applied to the consciousness degradation determination system which determines that the driver is in the consciousness-degraded state when determining that drift occurs and outputs a warning when the driver is in the consciousness-degraded state. However, the information (consciousness degradation flag) of the consciousness-degraded state (information about whether drift occurs) may be used by other systems, such as an air suspension control system, a lane keeping assist system, a tire pressure warning system, and a misalignment warning system. In addition, the invention may be applied to a drift-assessment device which determines drift and information about drift may be used by each system.

In this embodiment, the consciousness degradation determination system is provided with the ECU and the ECU performs the process of selecting the drift-assessment means, the process of determining whether drift occurs, the warning control process, and the threshold value learning process. However, the processing device in the white line recognition camera may perform these processes.

In this embodiment, the steering angle is used as the turn information of the vehicle for determining drift and the steering angle sensor is used. However, other parameters, such as a steering angle speed and a yaw rate, may be used as the turn information and sensors corresponding to the parameters may be used.

In this embodiment, the processing unit which learns the vehicle speed range switching threshold value is provided. However, the learning may not be performed. In this case, the initial value described in this embodiment may be used as the vehicle speed range switching threshold value without any change or the driver may set (or select) a vehicle speed of the vehicle speed range switching threshold value.

INDUSTRIAL APPLICABILITY

The invention can be applied to a drift-assessment device including a turn information detection unit that detects the turn information of the vehicle and an image recognition and detection unit that detects information about the position of the vehicle relative to the lane by recognizing the captured image including the road on which the vehicle is traveling.

REFERENCE SIGNS LIST

1: CONSCIOUSNESS DEGRADATION DETERMINATION SYSTEM
10: WHITE LINE RECOGNITION CAMERA
11: STEERING ANGLE SENSOR
12: VEHICLE SPEED SENSOR
20: WARNING DEVICE
30: ECU
31: DRIFT-ASSESSMENT MEANS SELECTION UNIT
32: DRIFT OCCURRENCE DETERMINATION UNIT
33: WARNING CONTROL UNIT
34: THRESHOLD VALUE LEARNING UNIT

The invention claimed is:

1. A drift-assessment device for determining vehicle drift while traveling, comprising:

a turn information detection unit that detects turn information of a vehicle;

an image recognition and detection unit that detects an amount of offset of the vehicle from a center of a line by recognizing a captured image including a road on which the vehicle is traveling;

a vehicle speed detection unit that detects a speed of the vehicle;

a selection unit that selects the image recognition and detection unit when the speed of the vehicle detected by the vehicle speed detection unit is equal to or greater than a predetermined vehicle speed and selects the turn information detection unit when the speed of the vehicle detected by the vehicle speed detection unit is less than the predetermined vehicle speed; and a drift-assessment unit that stops the turn information detection unit when the selection unit selects the image recognition and detection unit, and determines the drift of the vehicle on the basis of only the amount of offset of the vehicle from the center of the line detected by the image recognition and detection unit, and that stops the image recognition and detection unit when the selection unit selects the turn information detection unit, and determines the drift of the vehicle on the basis of only the turn information of the vehicle detected by the turn information detection unit.

2. The drift-assessment device according to claim 1, further comprising:

a learning unit that determines the predetermined vehicle speed on the basis of the speed of the vehicle detected by the vehicle speed detection unit when an image recognition state is changed between a state in which the image recognition and detection unit can recognize the lane and a state in which the image recognition and detection unit cannot recognize the lane.

3. The drift-assessment device according to claim 1, wherein when the drift assessment unit determines that a drift of the vehicle occurs based on the amount of offset of the vehicle from the center of the line detected by the image recognition and detection unit or based on the turn information of the vehicle detected by the turn information detection unit, the drift assessment unit determines that a consciousness-degraded state occurs and a warning control unit outputs a warning.

* * * * *